United States Patent
Seo

(10) Patent No.: US 9,686,418 B2
(45) Date of Patent: Jun. 20, 2017

(54) METHOD FOR TRANSMITTING MESSAGE, METHOD FOR SELLING MESSAGE BOX AND COMPUTER-READABLE RECORDING MEDIUM HAVING PROGRAM RECORDED THEREON

(71) Applicant: Yong Chang Seo, Seoul (KR)

(72) Inventor: Jin Ho Seo, Gyeonggi-do (KR)

(73) Assignee: Yong Chang Seo (KR)

( * ) Notice: Subject to any disclaimer, the term of this patent is extended or adjusted under 35 U.S.C. 154(b) by 0 days.

(21) Appl. No.: 14/902,803

(22) PCT Filed: Jul. 3, 2014

(86) PCT No.: PCT/KR2014/005934
§ 371 (c)(1),
(2) Date: May 6, 2016

(87) PCT Pub. No.: WO2015/002475
PCT Pub. Date: Jan. 8, 2015

(65) Prior Publication Data
US 2016/0255206 A1  Sep. 1, 2016

(30) Foreign Application Priority Data

Jul. 5, 2013 (KR) .......................... 10-2013-0079188

(51) Int. Cl.
*H04M 15/00* (2006.01)
*H04W 4/12* (2009.01)
(Continued)

(52) U.S. Cl.
CPC ........ *H04M 15/8221* (2013.01); *G06F 3/017* (2013.01); *G06F 3/0484* (2013.01);
(Continued)

(58) Field of Classification Search
CPC .... H04M 15/8221; H04L 51/08; H04L 51/10; H04L 51/20; G06Q 30/0643; G06T 11/00
(Continued)

(56) References Cited

U.S. PATENT DOCUMENTS 9,262,780 B2 * 2/2016 Petrou ................ G06Q 30/0623
2011/0145093 A1 * 6/2011 Paradise ................ G06Q 30/02
705/26.41

(Continued)

FOREIGN PATENT DOCUMENTS

KR  10-0677502       1/2007   ............... H04B 1/40
KR  10-2011-0121835  11/2011  ............. A63F 13/00
(Continued)

OTHER PUBLICATIONS

Korean Official Action for related Korean Patent Application 10-2013-0079188, dated Aug. 25, 2014 (4 pages).
(Continued)

*Primary Examiner* — Cong Tran
(74) *Attorney, Agent, or Firm* — Hayes Soloway P.C.

(57) ABSTRACT

Disclosed technology relates to a method for transmitting a message, and more specifically but without limitations, to a method for transmitting a message in which if a shooting gesture is inputted by a user, an image showing that a message box flies to a receiver is implemented as augmented reality and outputted to a screen, and a message is transmitted to the receiver. A method for transmitting a message in a user terminal according to one of the embodiments comprises the steps of: acquiring an image through a camera equipped in the user terminal; receiving a message transmission request from a user; outputting an image showing that a message box flies to the receiver while superimposing
(Continued)

the image onto the acquired image according to the message transmission request; and transmitting the message to the receiver.

10 Claims, 6 Drawing Sheets

(51) Int. Cl.
| | |
|---|---|
| H04W 4/02 | (2009.01) |
| H04L 12/58 | (2006.01) |
| G06F 3/01 | (2006.01) |
| G06F 3/0484 | (2013.01) |
| G06F 3/0488 | (2013.01) |
| G06Q 30/04 | (2012.01) |
| G06Q 30/06 | (2012.01) |
| G06T 19/00 | (2011.01) |
| H04M 1/725 | (2006.01) |

(52) U.S. Cl.
CPC ......... *G06F 3/04883* (2013.01); *G06Q 30/04* (2013.01); *G06Q 30/0643* (2013.01); *G06T 19/006* (2013.01); *H04L 51/08* (2013.01); *H04L 51/10* (2013.01); *H04L 51/20* (2013.01); *H04M 1/72544* (2013.01); *H04M 1/72555* (2013.01); *H04M 1/72569* (2013.01); *H04W 4/027* (2013.01); *H04W 4/12* (2013.01); *A63F 2300/537* (2013.01); *H04M 1/72552* (2013.01); *H04M 2250/52* (2013.01)

(58) Field of Classification Search
USPC ............. 455/406, 457, 566; 705/26.1, 26.35, 705/26.4, 27.1, 27.2
See application file for complete search history.

(56) References Cited

U.S. PATENT DOCUMENTS

| | | | |
|---|---|---|---|
| 2013/0073637 A1 | 3/2013 | Kim | 709/206 |
| 2014/0100996 A1* | 4/2014 | Klein | G06T 1/00 705/27.2 |

FOREIGN PATENT DOCUMENTS

| | | | |
|---|---|---|---|
| KR | 10-2012-0007215 | 1/2012 | ............. G06T 15/00 |
| KR | 10-2013-0029683 | 3/2013 | ............. G06T 17/00 |

OTHER PUBLICATIONS

Korean Decision of Rejection for related Korean Patent Application 10-2013-0079188, dated Apr. 27, 2015 (5 pages).
Korean Notice of Allowance for related Korean Patent Application 10-2013-0079188, dated Aug. 10, 2015 (5 pages).
Written Opinion for corresponding PCT Application Serial No. PCT/KR2014/005934 dated Sep. 29, 2014 (5 pgs).
International Search Report for corresponding PCT Application Serial No. PCT/KR2014/005934 dated Sep. 29, 2014 (3 pgs).

\* cited by examiner

FIG. 2
| MESSAGE BOX | | MASS | AIR RESISTANCE |
|---|---|---|---|
| 210 | 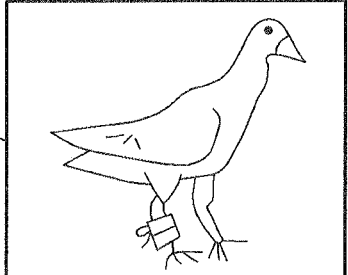<br>CARRIER PIGEON | 50 | 30 |
| 220 | 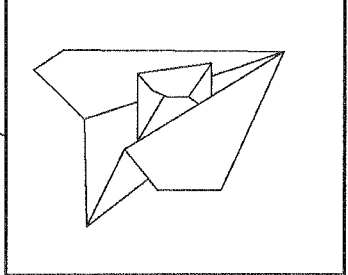<br>AIRPLANE | 10 | 50 |
| 230 | 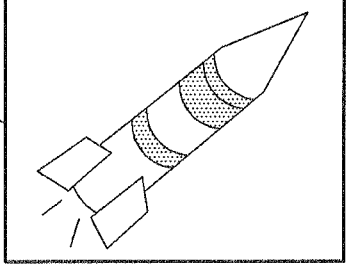<br>MISSILE | 300 | 20 |

ID COMMUNICATIONS USING MOBILE COMMUNICATION TERMINALS

METHOD FOR TRANSMITTING MESSAGE, METHOD FOR SELLING MESSAGE BOX AND COMPUTER-READABLE RECORDING MEDIUM HAVING PROGRAM RECORDED THEREON

TECHNICAL FIELD

Technology described herein relates to a method of transmitting a message, a method of selling a message box, and a computer-readable recording medium in which a program for the methods is recorded, and more particularly but without a limitation, to a method of transmitting a message to a receiver by embodying and outputting, as augmented reality, a message box moving to the receiver in response to reception of an input of a message transmission command from a user, and to a method of selling such a message box to a user.

BACKGROUND ART

Amid the propagation of mobile communication terminals, extending greetings or asking business may be more frequently conducted using a short message service (SMS) in lieu of a voice call. In addition, an increase in data communications using mobile communication terminals may lead to an appearance of various instant message or messenger services. Using an instant message service, images and audio files may be transmitted. It may be important for such an instant message service to secure numerous service subscribers. However, in a situation in which first runners in the service, for example, WhatsApp, Kakao Talk, and Facebook Chat, already dominate the market, it may not be easy for second runners to enter the market. In addition, service competitions among service providers are becoming more intensified to maintain the secured service subscribers or increase the number of service subscribers.

For example, Korean Patent Publication No. 10-2011-0121835 entitled "game terminal for using a camera and operating method for the same" discloses a game terminal and an operating method of the game terminal that may measure a movement of the game terminal and throw an item based on augmented reality technology.

DESCRIPTION OF DISCLOSURE

Technical Goals

An aspect of the present disclosure provides technology to provide a new service in which a game is combined with a message service. A method of transmitting a message according to the technology provided herein may allow a user to be entertained by, for example, playing a shooting game, while simply transmitting a message. In addition, the technology provided herein may enhance a sense of reality and generate an effect of throwing the message to a receiver by applying gesture recognition technology and augmented reality technology.

Technical Solutions

According to an aspect of the present disclosure, there is provided a method of transmitting a message from a user terminal, the method including obtaining an image using a camera embedded in a user terminal, receiving a transmission command of a message as an input from a user of the user terminal, applying a message box moving to a receiver to the obtained image based on the transmission command and outputting the image to which the message box is applied, and transmitting the message to the receiver.

According to another aspect of the present disclosure, there is provided a method of selling a message box, the method including receiving, by a selling server, a request for sales information of at least one message box from a user terminal, wherein the message box is an item embodying a message transmission medium and to be displayed on a screen of the user terminal as an augmented reality-based virtual object, reading out, by the selling server, the sales information of the at least one message box and transmitting the read sales information to the user terminal, performing, by the selling server, a billing process for any one of the at least one message box of which the sales information is transmitted, in response to a request for purchase of the one of the at least one message box transmitted from the user terminal, and transmitting the one of the at least one message box for which the billing process is completed from the selling server to the user terminal.

According to still another aspect of the present disclosure, there is provided a non-transitory computer-readable storage medium storing a program for causing a processor to perform the method.

Advantageous Effects

According to example embodiments of the present disclosure, the following effects may be achieved. However, the example embodiments may not include all these effects, and a claim scope of the present disclosure is not construed as being limited thereto.

According to example embodiments of the present disclosure, a user may be entertained by transmitting a message as if playing a game. An augmented effect of throwing a message box to an actual receiver may be achieved by applying augmented reality technology and configuring a display.

BRIEF DESCRIPTION OF DRAWINGS

FIG. 2 is a diagram illustrating a message box according to an embodiment.

BEST MODE FOR CARRYING OUT THE DISCLOSURE

Figure 1:
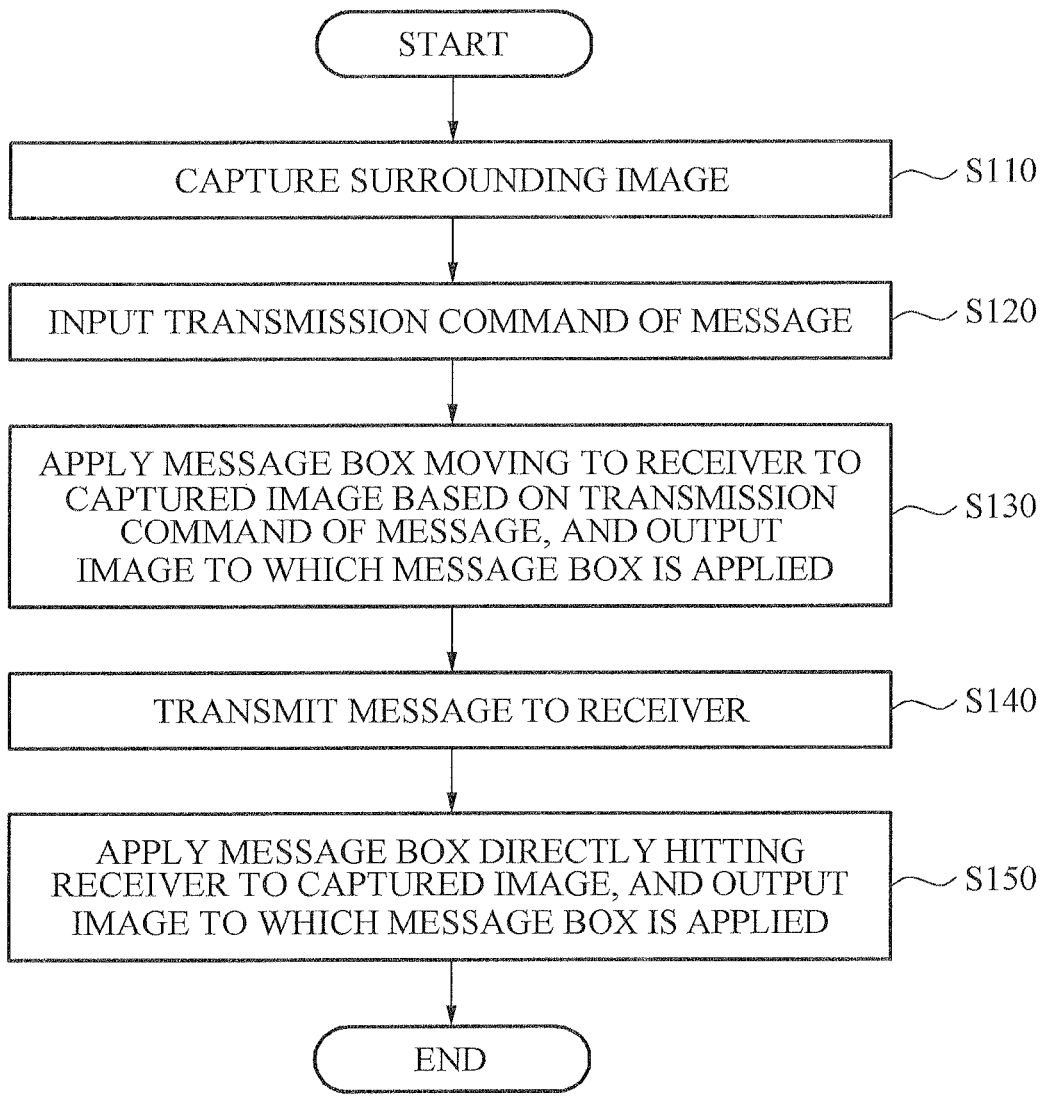
FIG. 1 is a flowchart illustrating a method of transmitting a message according to an embodiment.

The following detailed description is provided as illustrative examples only to describe structural and functional features of the present disclosure, and thus the present disclosure is not to be construed as being limited by the examples described herein. That is, various changes, modifications, and equivalents of the methods, apparatuses, and/ or systems described herein will be apparent to one of ordinary skill in the art, and thus the examples described herein have been provided so that this disclosure will be thorough and complete, and will convey the full scope of the disclosure to one of ordinary skill in the art.

The terminology used herein is for the purpose of describing particular examples only and is not intended to limit the disclosure. Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be connected, coupled, and joined between the first and second components, although the first component may be directly connected, coupled, or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

In addition, as used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a flowchart illustrating a method of transmitting a message according to an embodiment. According to an embodiment, the method of transmitting a message, hereinafter simply referred to as a message transmitting method, may add a game element to a general message transmitting method to transmit a message by throwing a message box towards a receiver based on a message transmission command input from a user, as if playing a shooting game. The message box is an item embodying a transmission medium including a message, for example, a carrier pigeon, an airplane, a missile, and a mailbox, or may include, for example, a letter paper and a letter envelope including message contents.

FIG. 2 is a diagram illustrating a message box according to an embodiment. Referring to FIG. 2, the message box is determined as one of a carrier pigeon 210, an airplane 220, and a missile 230, and each may have a mass value and an air resistance value. The mass and air resistance values are used to embody a message box moving or flying to a receiver in operation S130. Although the mass and air resistance values are indicated as an attribute of the message box, the message box may have various attributes, for example, a volume, a density, and a material quality. The message box may be determined based on a marker, selected by a user, or determined based on a distance between the user and the receiver. For example, the airplane 220 may be determined as the message box for a short distance, the carrier pigeon 210 for a middle distance, and the missile 230 for a long distance.

The message transmitting method will be described in detail hereinafter with reference back to FIG. 1. In operation S110, the user obtains a surrounding image using a camera embedded in a user terminal of the user. The message transmitting method may improve a sense of reality and interest in a message transmitting game using augmented reality technology. Such augmented reality technology may be used to embody an image appearing as if a user transmits a message by throwing a message box directly to a receiver in a real world.

In operation S120, the user terminal receives a transmission command of a message, which is a command for transmitting a message, as an input from the user. The user terminal may specify the receiver by receiving a preregistered name, phone number, mail address, and the like from the user, or by performing facial recognition on the obtained image. The transmission command may be input from the user pressing or touching a button corresponding to a command, for example, "transmit," "launch," "start," or "send." Alternatively, the transmission command may be input from the user performing a shooting gesture. The shooting gesture may be a motion input for commanding transmission of a message, and may be input through a user interface. The user terminal may receive an attribute value of the transmission command from the user. The attribute value of the transmission command may be associated with transmission of the message box, and may be received as a value of a moving direction, a moving speed, a moving distance, a movement time, and the like of the message box from the user, or be calculated based on a direction, a distance, a speed, a displacement, a time, and the like of the shooting gesture.

The shooting gesture may be a hand gesture to be input through a touch sensor of the user terminal or a motion sensor of the user terminal configured to sense or detect a movement occurring in the vicinity of the user terminal. In such a case, the shooting gesture may be converted to data including at least one set of information about a moving direction, a moving distance, a speed, a displacement, and a time of the hand gesture. For example, the user terminal may receive, as an example of the shooting gesture, a gesture of pulling the message box displayed on a touch display and then putting the message box, which is performed by the user, through a touch panel. For another example, the user terminal may receive the shooting gesture by detecting a movement of a finger in an image input through the camera, or by detecting a change in an air pressure by a movement of a finger through a microphone.

According to another example, the shooting gesture may be a movement of the user terminal to be input through the motion sensor of the user terminal. In such a case, the shooting gesture may be converted to data including at least one set of information about a moving direction, a moving distance, a speed, a displacement, and a time of the user terminal. For example, when the user performs a gesture of grabbing the user terminal and then throwing the user terminal, data such as moving direction data, moving distance data, speed data, displacement data, or time data of the user terminal may be obtained by measuring a speed, a direction, an angle, a distance, and the like of the user terminal through a gravity sensor, a geomagnetic sensor, an acceleration sensor, and a gyrosensor embedded in the user terminal.

The attribute value of the transmission command may be used to embody an augmented reality image of the moving message box in a subsequent operation.

In operation S130, the user terminal applies the message box moving to the receiver based on the transmission command based on the augmented reality technology, and outputs the image to which the message box is applied. A detailed method of outputting the message box onto a screen will be described with reference to FIG. 3.

In operation S140, the user terminal transmits the message to the receiver. According to an embodiment, only when the transmission command adjusted to allow the message box to directly hit the receiver is input, the user terminal may transmit the message to the receiver. When the message box does not directly hit the receiver, the transmission command may be continuously input until the message box directly hits the receiver. Alternatively, when the transmission command is input, the message box being transmitted may be displayed on the screen irrespective of whether the message box directly hits the receiver, and the message may be transmitted to the receiver.

In operation S150, when the message arrives at the receiver, the user terminal applies the message box directly hitting the receiver to the obtained image, and output the image to which the message box is applied. For example, a missile being exploded or a pigeon setting off fireworks while hovering around the receiver may be displayed on the obtained image by being augmented.

The message box may be augmented in a captured image based on a marker or markerless. For example, in a marker-based method, a message box suitable for a type of a marker to be detected in the captured image may be embodied and augmented on the screen, and the message box may fly emitting a flame and smoke when the transmission command is input from the user.

Figure 3:
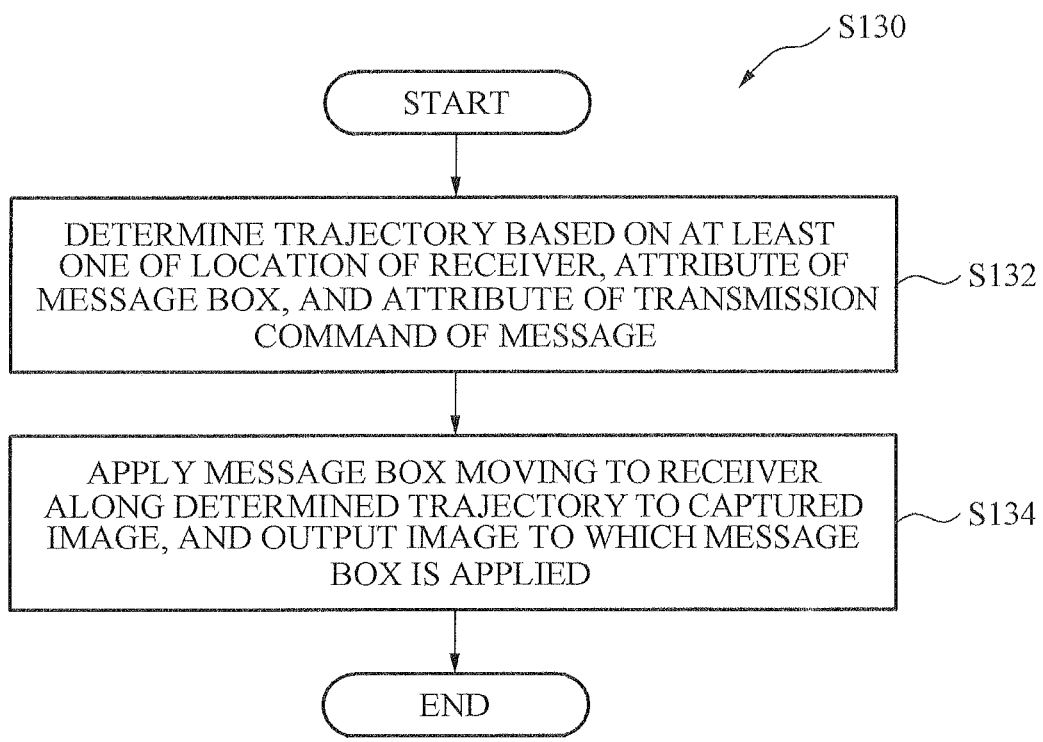
FIG. 3 is a flowchart illustrating a method of augmenting, on a screen, a moving to message box according to an example embodiment.

FIG. 3 is a flowchart illustrating a method of augmenting a moving message box on a screen according to an example embodiment. A method of embodying a moving message box by a user terminal will be described hereinafter. In operation S132, the user terminal determines a trajectory based on a location of a receiver, an attribute of the message box, an attribute of a transmission command of a message, and the like. For example, the user terminal may determine the trajectory based on a mass and an air resistance of a selected message box, and a direction and a speed of a shooting gesture. For another example, the user terminal may determine the trajectory by setting the location of the receiver to be a destination of the trajectory, and setting the direction and the speed of the shooting gesture to be an initial setting value. For example, the user terminal may determine the trajectory according to technology disclosed in Korean Patent Publication No. 10-2011-0121835 (entitled "game terminal for using a camera and operating method for the same"). When the receiver is included in an obtained image, the user terminal may detect the location of the receiver from the obtained image. Conversely, when the receiver is not included in the obtained image, the user terminal may detect the location of the receiver based on global positioning system (GPS) information of a terminal of the receiver.

Figure 4:
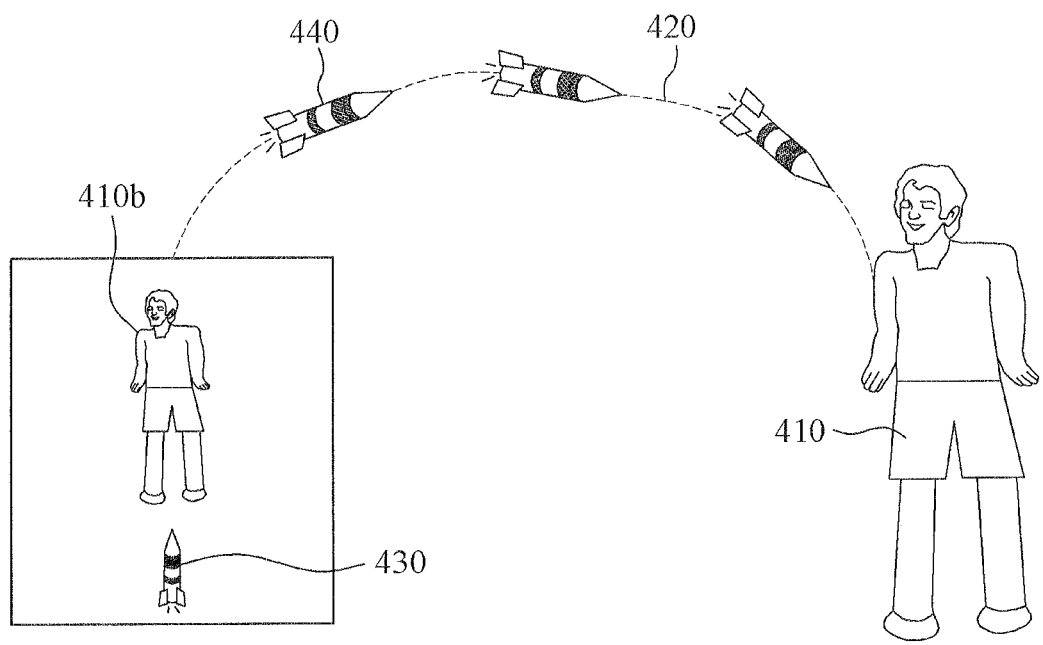
FIG. 4 is a diagram illustrating a trajectory along which a message box moves when a receiver is included in an obtained image according to an example embodiment.
Figure 5:
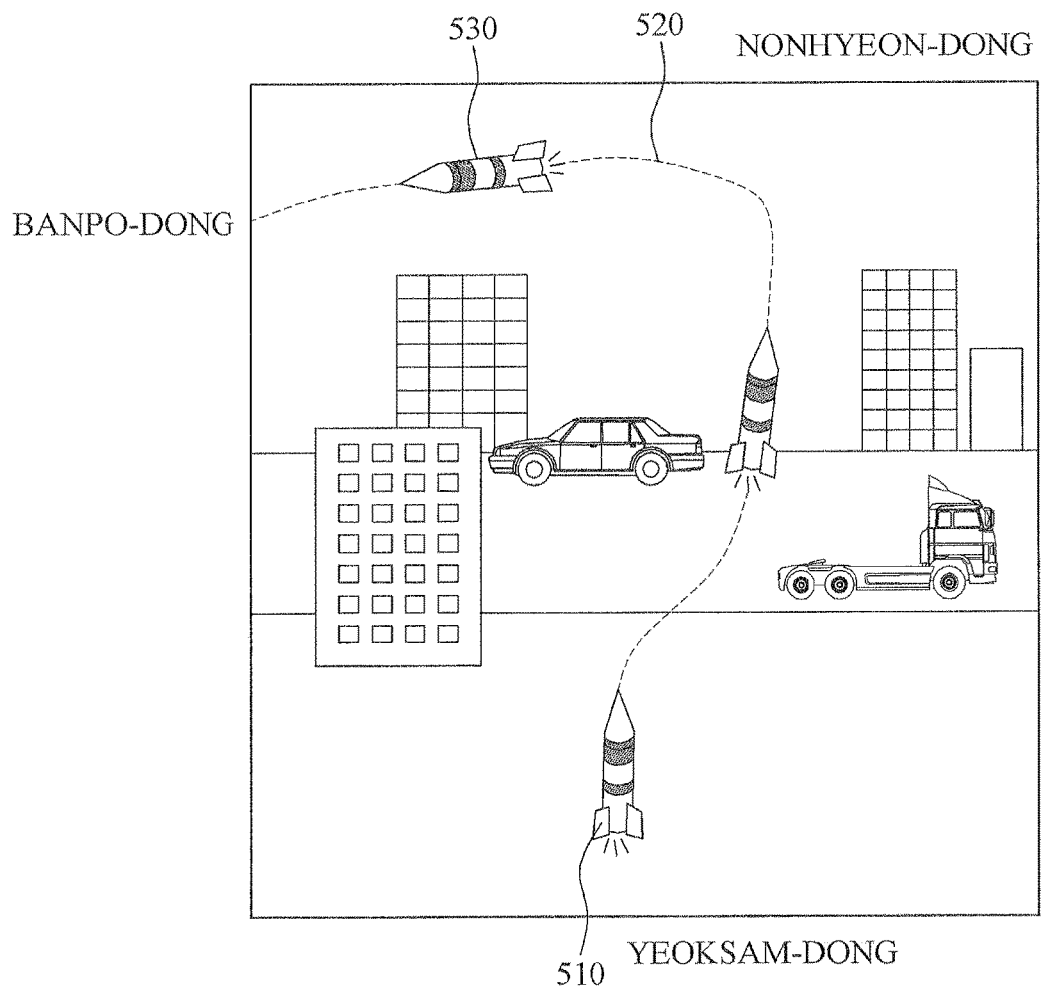
FIG. 5 is a diagram illustrating a trajectory of a message box to transmit a message to a remotely located receiver according to another example embodiment.

FIGS. 4 and 5 are diagrams illustrating examples of a trajectory along which a message box moves. FIG. 4 is a diagram illustrating an example of a trajectory along which a message box moves when a receiver is included in an obtained image according to an example embodiment. Although a user terminal may detect a location 410a of a receiver using GPS information of a receiving-end terminal when the receiving-end terminal is specified, detecting a location 410b of the receiver by analyzing an obtained image may enable a higher accuracy in embodying augmented reality. When a user performs, as a shooting gesture, a gesture of grabbing a missile 430 displayed on a touch display and then putting the missile 430, the user terminal may determine a trajectory 420 from the user terminal to a detected location of the receiver. FIG. 5 is a diagram illustrating an example of a trajectory of a message box to transmit a message to a remotely located receiver according to another example embodiment. In the example of FIG. 5, a user located in Yeoksam-dong arranges a user terminal towards Nonhyeon-dong and inputs a shooting gesture to transmit a message to a receiver located in Banpo-dong. Here, the user terminal may receive information of the receiver from the user, and detect a location of the receiver using GPS information of a receiving-end terminal. When the location of the receiver is determined, the user terminal may determine a trajectory 520 by determining an initial trajectory value based on the shooting gesture and setting the location of the receiver as a destination.

Referring back to FIG. 3, in operation S134, when the trajectory is determined, the user terminal renders, on the captured image, the message box moving to the receiver along the trajectory. For example, based on the trajectory, for example, the trajectory 420 and the trajectory 520 of FIGS. 4 and 5, respectively, an image of a message box flying as illustrated in, for example, 440 of FIG. 4 and 530 of FIG. 5, may be augmented in an image obtained using a camera and the augmented image may be displayed on a screen.

Figure 6:
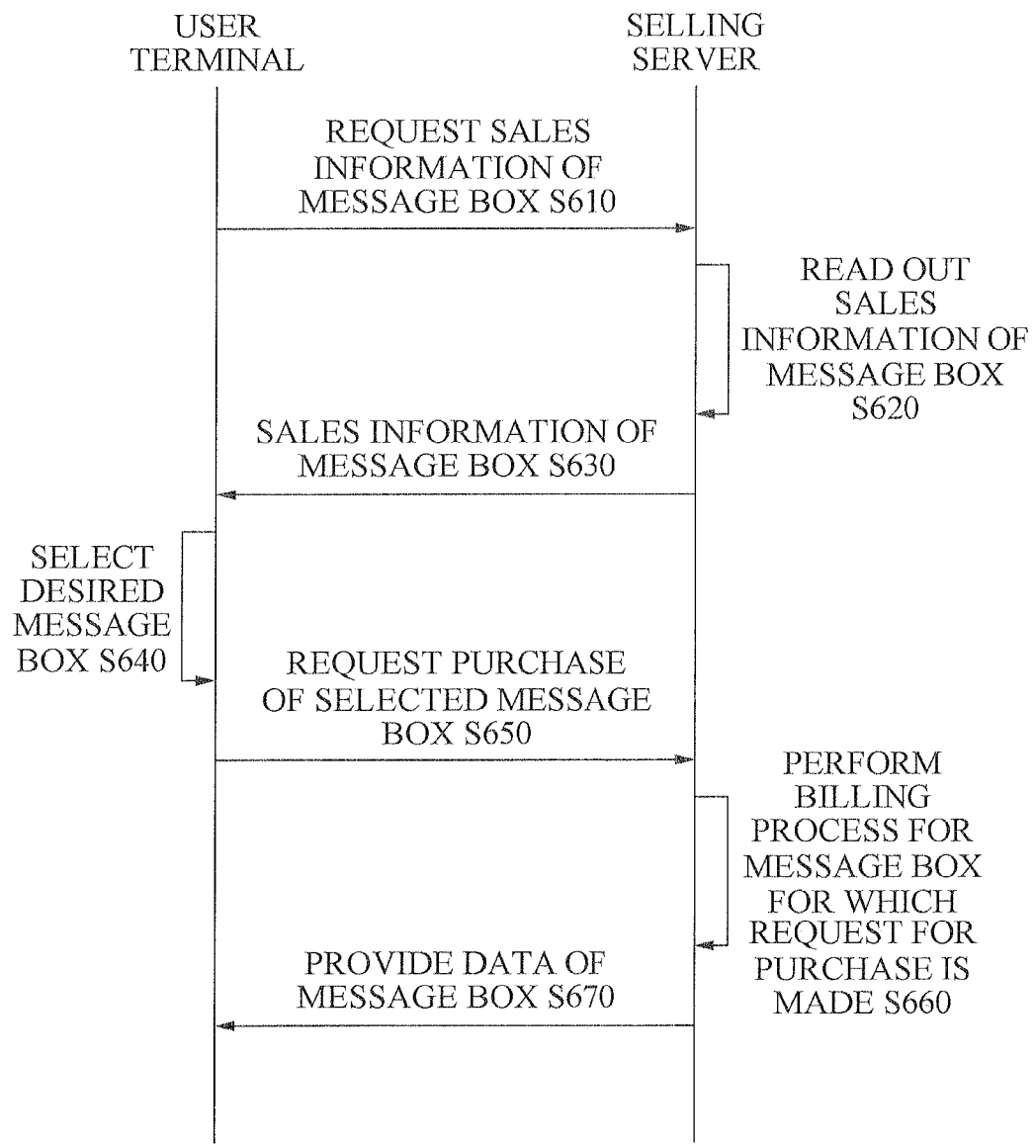
FIG. 6 is a diagram illustrating a flow of a method of selling a message box according to an example embodiment.

FIG. 6 is a diagram illustrating a flow of a method of selling a message box according to an example embodiment. According to an example embodiment, a new business model of selling a message box is provided based on the message transmitting method described with reference to FIG. 1.

In operation S610, a selling server receives a request for sales information of at least one message box from a user terminal. Here, the message box is an item embodying a message transmission medium, and is displayed on a screen of the user terminal as an augmented reality-based virtual object. In operation S620, the selling server reads out sales information of at least one preregistered message box. For example, the message box may be prestored or preregistered in the selling server, after developed by a message transmission service provider or a third party desiring to sell the message box. In operation S630, the selling server transmits, to the user terminal, the read sales information of the at least one message box. In operation S640, the user terminal receiving the sales information of the at least one message box outputs the sales information to allow a user to select a desired message box. In operation S650, the user terminal requests purchase of the selected message box. In operation S660, when the request for the purchase of the message box is input from the user terminal, the selling server performs a billing process for the message box for which the request for the purchase is made. In operation S670, the selling server transmits, to the user terminal, the message box for which the billing process is completed to allow the user to use the message box. The selling server may operate in a single computer, or operate in a plurality of computers operating based on each function.

The above-described embodiments of the present disclosure may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure, or vice versa.

Although a few embodiments of the present disclosure have been shown and described, the present disclosure is not limited to the described embodiments. Instead, it would be appreciated by those skilled in the art that changes may be made to these embodiments without departing from the principles and spirit of the disclosure, the scope of which is defined by the claims and their equivalents.

The invention claimed is:

1. A method of transmitting a message from a user terminal, the method comprising:
   obtaining an image using a camera embedded in a user terminal;
   receiving a transmission command of a message as an input from a user of the user terminal;
   applying a message box moving to a receiver to the obtained image based on the transmission command of the message, and outputting the image to which the message box is applied; and
   transmitting the message to the receiver,
   wherein the message box is transmission medium including the message,
   wherein the input is related to shooting gesture which is a gesture throwing the message box toward a receiver in the image by grabbing and putting the message box displayed in the screen of the user terminal,
   wherein the applying comprising:
   determining a trajectory of the message box based on the shooting gesture; and rendering the message box moving along the trajectory from the user to the receiver in the image,
   wherein the message included in the message box is transmitted when the message box directly hit the receiver based on the shooting gesture,
   wherein the message included in the message box isn't transmitted until message box directly hits the receiver, when the message box does not directly hit the receiver based on the shooting gesture.

2. The method of claim 1, wherein the transmission command of the message is received as a shooting gesture that is a hand gesture input through a touch sensor or a motion sensor of the user terminal.

3. The method of claim 1, wherein the transmission command of the message is received as a shooting gesture that is a movement of the user terminal input through a motion sensor of the user terminal.

4. The method of claim 1, wherein the receiving comprises receiving an attribute value of the transmission command of the message from the user.

5. The method of claim 1, wherein the outputting comprises:
   determining a trajectory of the message box based on at least one of a location of the receiver, an attribute of the message box, and an attribute of the transmission command of the message; and
   rendering the message box being transmitted along the trajectory on the obtained image.

6. The method of claim 1, wherein the message box is determined to be a different type based on a distance between the receiver and the user.

7. The method of claim 1, in response to an arrival of the message at the receiver, further comprising:
   applying the message box directly hitting the receiver to the obtained image, and outputting the image to which the message box is applied.

8. The method of claim 1, further comprising:
   detecting a location of the receiver in the obtained image when the receiver is included in the obtained image; and
   detecting a location of the receiver based on global positioning system (GPS) information of a terminal of the receiver when the receiver is not included in the obtained image.

9. The method of claim 1, wherein the transmitting comprises:
   transmitting the message to the receiver when the message box directly hits the receiver based on the transmission command of the message.

10. A non-transitory computer-readable storage medium storing a program for causing a processor to perform the method of claim 1.

* * * * *